T. M. McDONALD.
TRACTOR TRAIN.
APPLICATION FILED JULY 11, 1917.
1,276,667.
Patented Aug. 20, 1918.
4 SHEETS—SHEET 3.
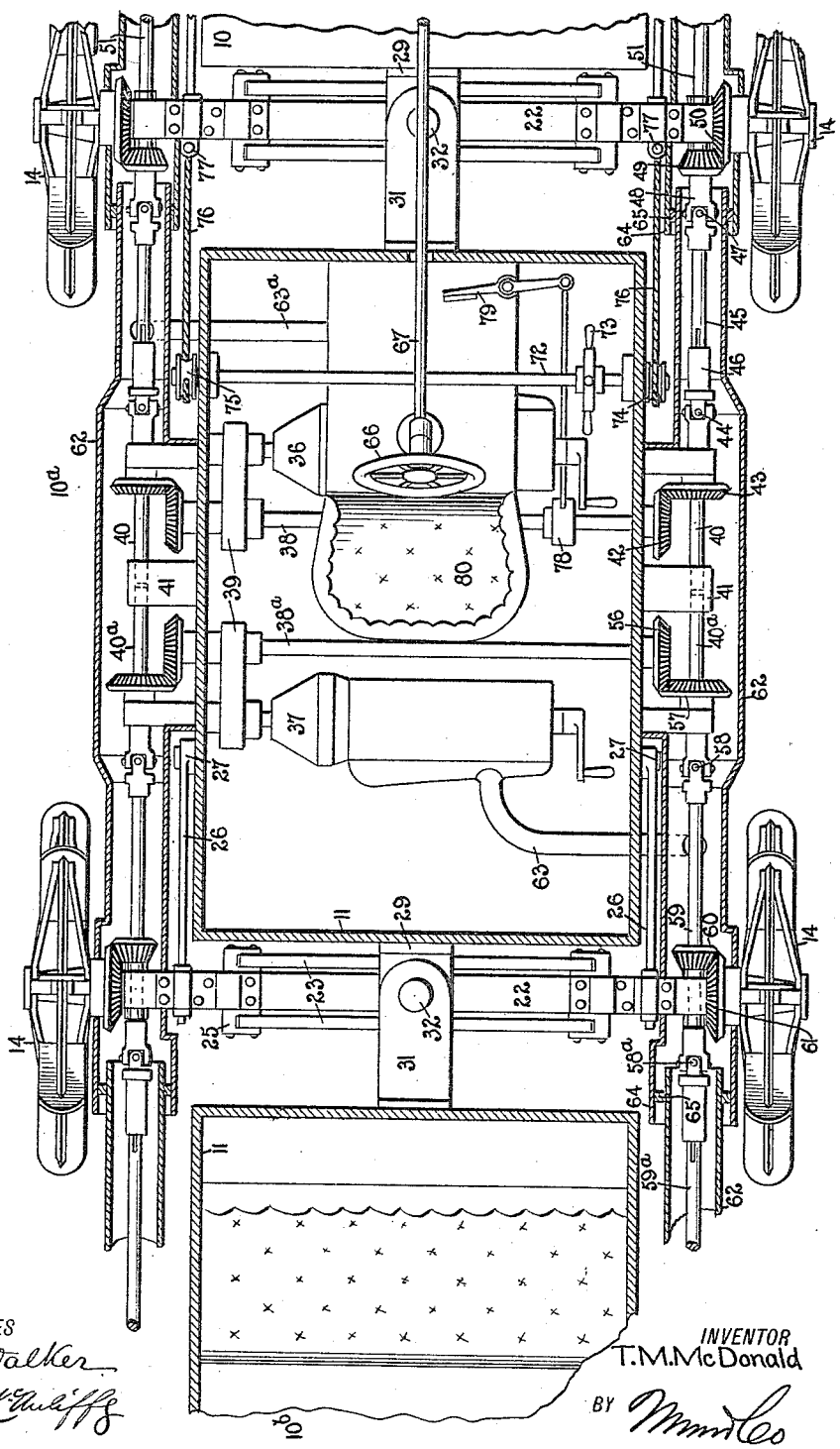

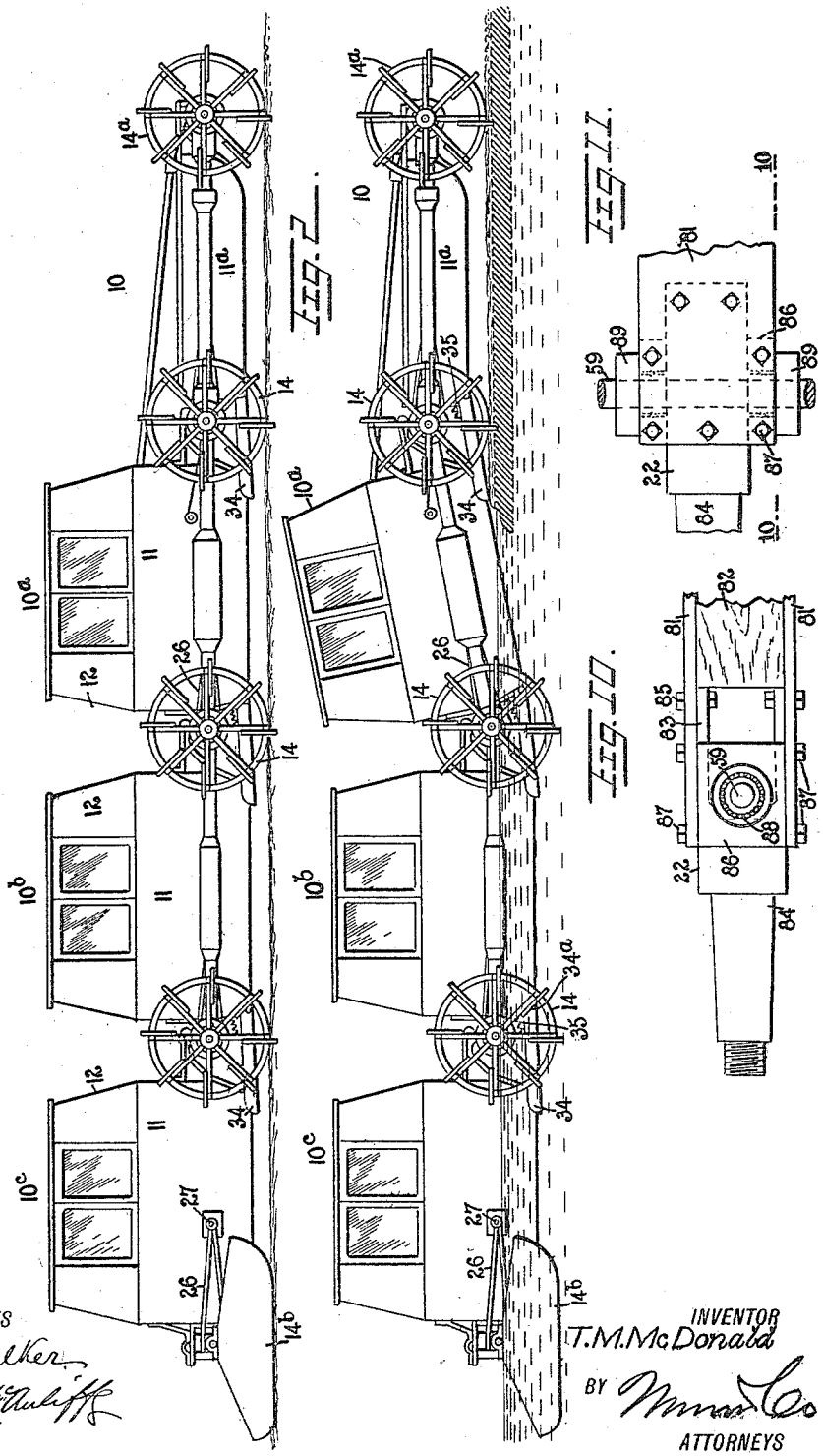

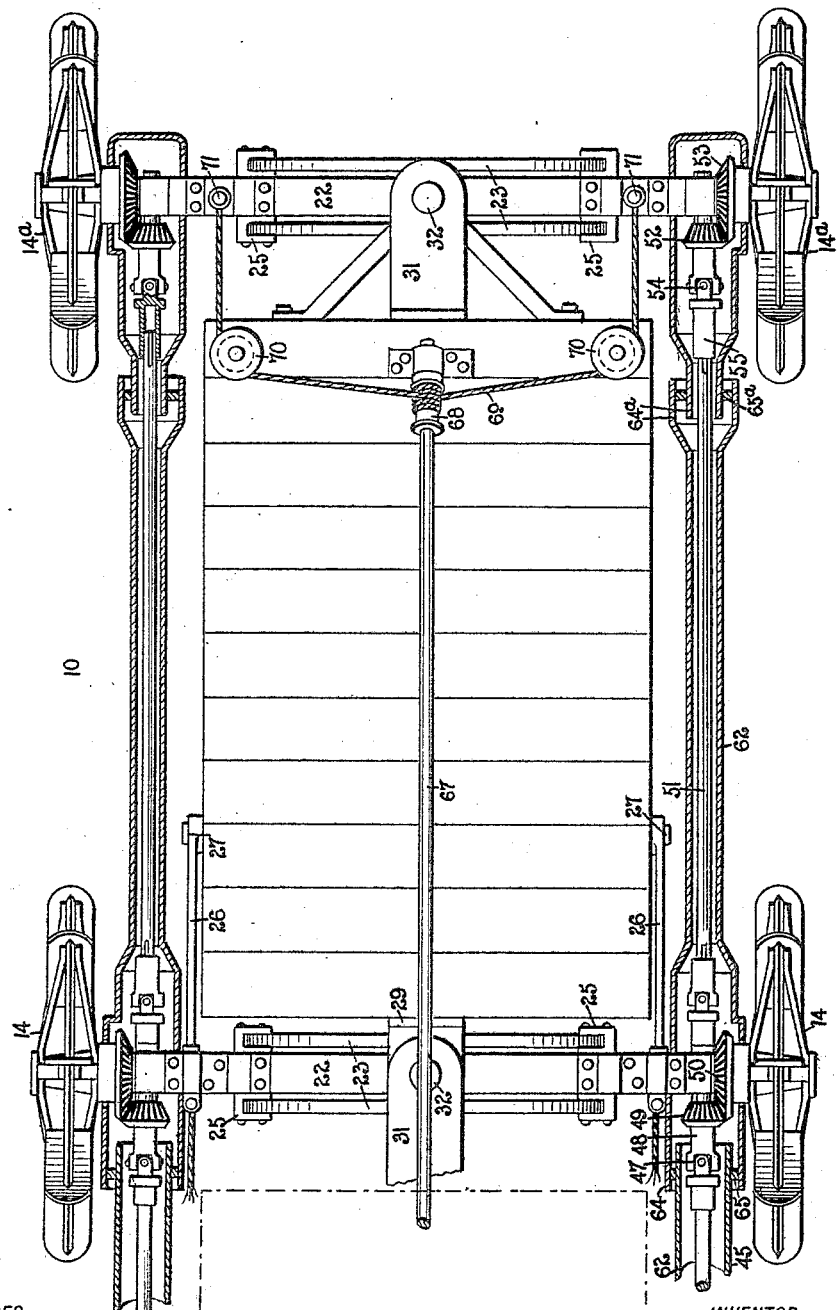

T. M. McDONALD.
TRACTOR TRAIN.
APPLICATION FILED JULY 11, 1917.
1,276,667.
Patented Aug. 20, 1918.
4 SHEETS—SHEET 4.
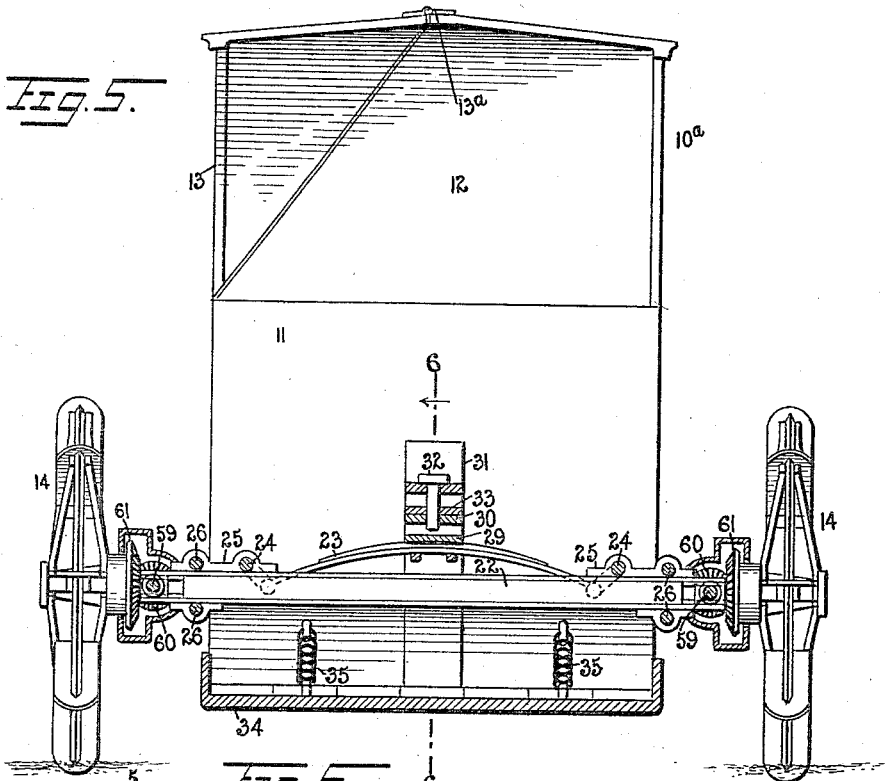
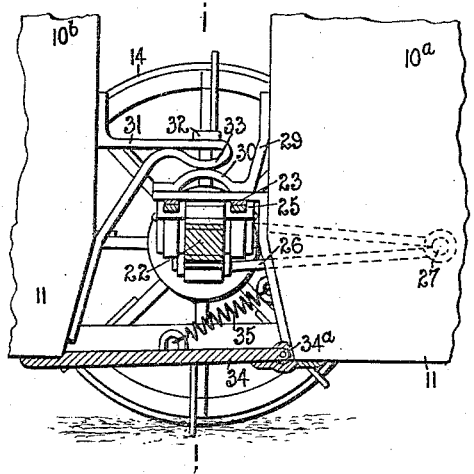
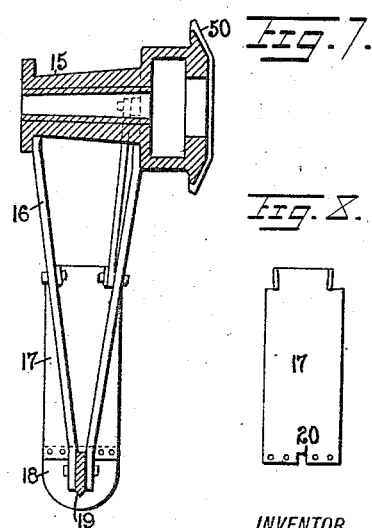
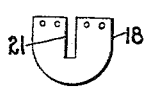
WITNESSES
H. J. Walker
J. L. McAuliffe
INVENTOR
T. M. McDonald
BY Munn & Co
ATTORNEYS

UNITED STATES PATENT OFFICE.

THOMAS MICHAEL McDONALD, OF D'ASTE, MONTANA.

TRACTOR-TRAIN.

1,276,667.   Specification of Letters Patent.   Patented Aug. 20, 1918.

Application filed July 11, 1917.   Serial No. 179,789.

*To all whom it may concern:*

Be it known that I, THOMAS M. McDONALD, a citizen of the United States, and a resident of D'Aste, in the county of Missoula and State of Montana, have invented a new and Improved Tractor-Train, of which the following is a full, clear, and exact description.

My invention relates to an automobile train, and more particularly the invention relates to an automobile train adapted to be propelled over ice or through water, the units in the train having buoyant bodies. It is to be understood, however, that in all phases my invention is not limited to trains especially designed for water and ice travel.

An object of the invention is to provide an automobile train having a pilot unit, a motor unit, and trailer units for passengers or merchandise, the motor unit being arranged to independently drive the pilot unit and trailer units in order that the respective drive wheels thereof may be driven at different speeds when desired, as for example, in causing the pilot to mount an ice field from the water.

The invention also has for an object to provide novel means whereby the pilot unit may be steered with facility when being propelled through water as well as under other travel conditions.

A further object of the invention is to provide an automobile train having the maximum flexibility of drive and coupling means.

The invention furthermore has for an object to provide means to prevent entrance of floating ice between the several units of the train.

Another object is to utilize the exhaust heat from the motor unit to prevent freezing of the shafting and gearing along the train units.

The invention has also for an object to provide an automobile train improved in various particulars with respect to its axle, springs, radius rods, and other important structural features.

The nature of the invention and its advantages will more clearly appear as the description proceeds.

Reference is to be had to the accompanying drawings forming part of this specification in which similar reference characters indicate corresponding parts in all the views, it being understood that the drawings are merely illustrative of one example of the invention.

Figure 1 is a side view of a tractor train embodying my invention;

Fig. 2 is a view similar to Fig. 1, showing the pilot unit after having mounted an ice field from the water;

Fig. 3 is a plan view of the pilot unit with parts in section, certain parts being omitted;

Fig. 4 is a sectional plan view of the motor unit and a portion of a pilot unit and trailer units, parts being omitted;

Fig. 5 is a transverse vertical section taken between the motor unit and the adjacent trailer unit as indicated by the line 5—5, Fig. 6;

Fig. 6 is a detail longitudinal vertical section at the coupled ends of two units;

Fig. 7 is a detail in section showing a portion of one of the paddling wheels or drive wheels;

Fig. 8 is a face view of one of the paddles;

Fig. 9 is a face view of the paddle tip;

Fig. 10 is a sectional side elevation of the outer portion of one of the built-up axles and one of the shaft bearings in said axle, the section being taken on the line 10—10, Fig. 11;

Fig. 11 is a broken plan view of the parts shown in Fig. 10.

In carrying out my invention in practice, in accordance with the illustrated example, the train is made up of a pilot unit 10, a motor unit 10$^a$, and any desired number of trailer units, there being indicated two, designated generally 10$^b$ and 10$^c$. Each of the units 10$^a$, 10$^b$, 10$^c$ has a deep, water-tight body 11 for passengers or merchandise which is buoyant for water travel. The body 11$^a$ of the pilot unit 10 is also given a suitable buoyant construction. The upper structure 12 of the units 10$^a$, 10$^b$, etc. may be provided with suitable windows as shown, and to afford convenient access to the body, an angular portion 13 is hinged as at 13$^a$ so that a portion of the roof and side may be swung to an open position.

The units in the train or as many as may be desired are provided with propelling wheels 14, these being disposed at the rear of the unit and power driven as hereinafter explained. In the case of the pilot unit 10 there is also a front axle with driven wheels 14$^a$. One or more of the trailer units may be provided, in traveling on ice, with runners 14$^b$ instead of the wheels 14$^a$. The form of combined paddle and tractor wheel employed by me is shown in detail in Figs. 7, 8 and 9. Each wheel comprises a suitable hub 15 having spokes 16 or equivalent body structure. Secured to the spokes or equivalent elements on each wheel are a series of paddles 17 and paddle tips 18 having a fairly sharp convex edge to engage the ice. The rim 19 of the wheel is received at the inner side thereof in a notch 20 in each blade 17 and in a slot 21 in each tip 18. The tips may be omitted from every second spoke or every second blade if desired to permit a certain degree of slip in the differential speed of the respective wheels of an axle. The wheels are mounted on built-up axles 22 mounted on which are springs 23, on which the body is supported, the shackles 24 of the springs being held by brackets or clips 25 on the axle. The brackets 25 are preferably also utilized for securing to the axle the rear ends of radius rods 26, the forward ends of which rods are bolted as at 27 to the body of a unit.

In order to so couple the units as to permit a lateral relative movement as well as a vertical rocking movement, a bracket 29 is secured to the body of each unit at the rear end and to the adjacent axle 22 and is formed with a rounded seat 30, while on the front end of an adjacent unit a bracket 31 is employed having a rounded under side 33 resting on the seat 30. A pivot bolt 32 passes loosely through the bracket 31 and rounded member 33, and through the seat 30, the arrangement permitting the member 33 to rock on the seat 30 to allow one unit to assume an angle in its vertical plane to the adjacent unit. The space between adjacent units is closed at the bottom by a closure 34 hinged as at 34$^a$ to the end of one unit and adapted to overlap the adjacent end. The closure 34 is maintained in closed position by a spring 35 and prevents the entrance of ice between the units.

The motor unit 10$^a$, which is best shown in Fig. 4, is equipped with separate and independent motors 36, 37 here conventionally shown, and a driving connection by any suitable gear is established between the motor shafts and counter-shafts 38, 38$^a$, it being understood that in practice any suitable gearing including a differential is employed, there being indicated conventionally, gear casings 39 in connection with the shafts of the motors 36, 37 and their respective driven shafts 38, 38$^a$. The motor 36 is geared to a shaft 40 at each side of the motor unit and as the shafting and gearing at each side of the train is the same, it will suffice to refer to the equipment at one side. Similarly, the shaft 38$^a$ driven from the motor 37 is geared to a longitudinal shaft 40$^a$ alining with the shaft 40, the shafts being mounted to turn in suitable bearings, one of which is indicated at 41, Fig. 4, at each side of the motor unit. Preferably I provide on the shaft 38 a beveled gear wheel 42 meshing with a similar wheel 43 on the shaft 40 and said shaft 40 includes a universal joint 44 and slip coupling 46 connecting the shaft with a shaft section 45, which in turn has a universal joint 47 connecting it with a shaft section 48 having a beveled gear wheel 49, meshing with a similar wheel 50 on the rear axle 22 of the pilot unit 10. Also, as shown in Fig. 3, the shaft section 51 rigid with the section 48, extends to the front axle 22 of the pilot unit and is provided with a slip coupling 55, a universal joint 54 and a bevel pinion 52 meshing with a similar pinion 53 on the front wheel 14$^a$. Referring again to the shafting and gearing of the motor unit as in Fig. 4, the counter-shaft 38$^a$ driven by the independent motor 37 has a beveled gear wheel 56 meshing with a similar gear wheel 57 on the shaft 40$^a$, which has a universal coupling 58 connecting it with the shaft section 59 which is provided with a bevel pinion 60 meshing with a similar pinion 61 on the rear axle 22 of the motor unit. The shafting and gearing are continued throughout the trailer units 10$^b$, etc., there being shown in Fig. 4 a universal coupling 58$^a$ connecting the shaft section 59 with the shaft section 59$^a$ extending along the adjacent unit 10$^b$.

In order to protect the shafting and gearing of the various units and prevent the same from being clogged with snow or ice, or freezing, I provide a housing 62 on each unit. The exhaust pipe 63 from one motor connects with the housing 62 at one side of the train, while the exhaust pipe 63$^a$ from the other unit connects with the housing at the opposite side. It is to be understood that any suitable connection may be employed between the housing 62 of adjacent units, there being indicated one expedient in Figs. 3 and 4 in which the meeting ends of the respective housings telescope as at 64, 64$^a$, there being employed resilient gaskets 65, 65$^a$ or other means permitting of a relative movement of the housing sections, while effecting an approximately air tight connection.

The numeral 66, Fig. 4, indicates a steering wheel and 67 a steering rod which extends forwardly as in Fig. 3 to the front end of the pilot unit 10, and is provided with a drum 68 on which steering cable 69 winds and extends in opposite directions over sheaves 70 and forwardly to a connection near each end of the front axle 22 as at 71, whereby to readily steer the front axle when traveling on ice or equivalent hard roads. In order to provide for effectively steering the train when being propelled in water, a transverse steering shaft 72 is provided having a steering wheel 73 and said shaft at the end has pulleys 74 on which cables 76 are adapted to wind in opposite directions, the one winding over its pulley and the other under its pulley, said cables being carried forwardly and secured as at 77 to the rear axle 22 of the motor unit 10. Thus, through the medium of the steering wheel 73 the rear axle 22 of the unit 10 and therefore the complete unit 10 may be deflected laterally to act as steering means. Any suitable brake means is provided, the numeral 78 indicating conventionally a band-brake controlled from a foot lever 79.

Comparing Figs. 1 and 2, the latter figure will indicate the manner in which the pilot unit is made to mount an ice field from the water, and this is effectively brought about by reason of the independent motors 36, 37 whereby the front wheels of the motor unit 10, upon striking an ice field, may revolve at a speed proportionate to the speed at which the train is traveling, while the driven wheels of the motor unit 10ª and on the trailer units may revolve at a higher rate of speed and thereby tend to force the pilot unit up onto the ice. It is to be understood also that the momentum of the train in approaching the ice contributes to the ready mounting of the pilot unit on the ice.

An operator's seat 80 is provided on the motor unit adjacent to the motors thereon to control and operate the same, and the steering wheels 66, 73, and the foot lever 79 are positioned within reach of the operator occupying said seat.

My improved axle 22 is of built-up construction comprising top and bottom metallic plates 81 and a wood filling 82 which terminates short of the ends of the plates 81 to receive the forked end 83 of an axle spindle 84. Bolts 85 secure the fork of the spindle to the plates 81. Within said fork bearing blocks or boxes 86 are secured by bolts or screws 87 and in said boxes ball bearings or roller bearings 88 are fitted in which the side drive shafts turn, there being indicated a portion of the shaft section 59. Collars 89 or other suitable devices are employed on the side shaft 59 to constitute caps or closures for the outer ends of the roller bearings.

I wish to state in conclusion that although the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:—

1. In an automobile train, a pilot unit having driven propelling wheels, additional units having propelling wheels, flexible connections between the units, said units having buoyant bodies to travel in the water, and the propelling wheels having means to give propulsion in the water or on ice, and separate motor-actuated drive means for the wheels of the pilot unit and for the wheels of the said additional units, whereby to utilize a speed in the wheels of an additional unit greater than that of the wheels of the pilot unit to assist in causing the pilot unit to mount an ice field from the water.

2. In an automobile train, a pilot unit, a motor unit behind the pilot unit, a unit trailing the motor unit, said units having rear propelling wheels, coupling connections between the units, a motor on the motor unit, drive connections between said motor and the propelling means of the pilot unit, a second independent motor on said motor unit, and drive connections between said second motor and the trailing unit independent of the first mentioned drive connections.

3. In an automobile train, the combination of a pilot unit, a motor unit, means to couple the units to permit varying their angular relation, a rear axle on the motor unit, front and rear axles on the pilot unit, propelling wheels on said axles, independent motors on the motor unit, means to establish driving connections between one of said motors and the propelling wheels of the pilot unit, means to establish driving connection between the other of said motors and the propelling wheels of the motor unit and independently of said drive connections with the wheels of the pilot unit, steering means controlling the front axle of the pilot unit, and independent steering means on the motor unit and connected with the pilot unit to bodily deflect the same for steering independently of the first mentioned steering means.

4. In an automobile train, the combination of a pilot unit, a motor unit, means to couple said units, front and rear wheels on the pilot unit, a front axle on which said front wheels are mounted, steering means on the motor unit and connected with said front axle, and independent steering means on the motor unit and connected with the pilot unit and adapted to bodily deflect the latter.

5. In an automobile train, a series of units, propelling means on the units, shafting extending along the respective units at the sides thereof and adapted to actuate the propelling means of the respective units, motor driven means to drive said shafting, means interposed in said shaft and conformable to vary the angular positions of said units, separate housings on the shafting, and extending along the respective units, and means to flexibly connect the housings of the respective units.

6. In an automobile train, a series of units, propelling means on the units, shafting extending along the respective units at the sides thereof and adapted to actuate the propelling means of the respective units, motor driven means to drive said shafting, means interposed in said shaft and conformable to vary the angular positions of said units, separate housings on the shafting, and extending along the respective units, means to flexibly connect the housings of the respective units, and adapted to establish communication between the same, and means to heat the said housings by heat from the said motor means.

7. In an automobile train, a plurality of separate units, means to couple the units, axles on the units, propelling wheels on the axles, motor means to drive said wheels, shafting along the sides of the units driven by said motor means and in driving connection with the said wheels, means to connect the shafting of the respective units, and bearings on said axles in which the said shafting turns.

8. In an automobile train, a plurality of units, means to couple the units, axles on the units, spindles on the said axles, bearings on the axles adjacent to the spindles, shafting on the units at the sides and turning in the said bearings, wheels on the axle spindles and driven by said shafting, and motor means to drive said shafting.

9. In an automobile train, a plurality of units, means to couple the said units, axles on the respective units, said axles having top and bottom plates, spindles on the axles, said spindles having spaced top and bottom members extending between the said plates, bearings on the axles between the spindle members, shafting extending along the sides of the units and turning in the bearings on the respective axles, wheels on the axle spindles and driven by said shafting, means to couple the shafting of the respective units, and motor means to drive the shafting.

10. In an automobile train, a plurality of separate units, means to couple said units, and movable closures between the respective units at the bottom thereof and extending transversely between the units.

11. In an automobile train, a plurality of units, means to couple said units, a closure between the adjacent ends of the units at the bottom thereof and extending from one unit to the other, means hinging said closure to one end of one unit to swing vertically, and spring means acting to hold said closure raised with its free end adjacent to the adjacent unit.

THOMAS MICHAEL McDONALD.

Copies of this patent may be obtained for five cents each, by addressing the "Commissioner of Patents, Washington, D. C."